May 6, 1958   W. S. LAWRENCE   2,833,685
PROCESS OF APPLYING A DECORATIVE SURFACE TO A
MOLDED ARTICLE OF THERMOSETTING RESIN
Filed April 23, 1956

INVENTOR.
Winthrop S. Lawrence
BY Connolly and Hutz
ATTORNEYS

United States Patent Office 2,833,685
Patented May 6, 1958

2,833,685

PROCESS OF APPLYING A DECORATIVE SURFACE TO A MOLDED ARTICLE OF THERMOSETTING RESIN

Winthrop S. Lawrence, Landenberg, Pa., assignor to Kaumagraph Company, Wilmington, Del., a corporation of Delaware Application April 23, 1956, Serial No. 579,950

3 Claims. (Cl. 154—110)

This invention relates to and has for its object, the provision of plastic articles containing a permanently affixed decorative design (and methods for the preparation of such articles).

The use of plastic materials has become increasingly important in recent years in several fields. In some instances, the plastic materials have replaced metals and in other instances, the plastics have replaced ceramic items. For example, substantial competition is now being offered by manufacturers of plastic products to those companies manufacturing the standard, old-type chinaware. A long recognized difficulty in the plastic article field has involved the inability to apply a good decorative design to the plastic. Several attempts have been made to find a satisfactory process for affixing designs to the plastic articles but none of them have been outstandingly successful and/or economical.

One of the more recent patents concerned with the problem of affixing a decorative design on plastic materials, is U. S. Patent No. 2,646,380 to Barlow et al. According to that patent, a design is printed on a paper and the paper, after resin impregnation, is placed face down into the mold used for manufacturing the decorated article. Such process is subject to numerous difficulties. For example, since the decorated side of the paper must be placed face down into the mold, the paper must be of limited thickness in order to enable the design to show through properly. On the other hand, since the paper must be comparatively thin, serious difficulties are encountered in printing prior to impregnation. Moreover, printing must be carried out in reverse in the prior art procedure (since the printed surface must be inserted to face the preform) while this disadvantageous procedure is eliminated by the present invention. These difficulties and others associated with the prior art are overcome by the present invention.

As has been indicated above, the preparation of decorated sheets for use in the manufacture of decorated plastic materials is subject to difficulties because, among other things, the paper is in itself too flimsy and dimensionally unstable to permit accurate sheet printing in register. According to the present invention, however, satisfactory results by sheet-fed offset lithography, may be effected by treating the paper in the manner described below before printing. Thus, the paper is treated initially in the web with a thermosetting resin solution of the same type as that used for the molded article (preferably a melamine formaldehyde resin solution) to obtain a partial impregnation and coating on only one side of the paper. Such treatment imparts sufficient rigidity and stability to the paper to enable a sheet-fed, lithographic printing operation to be carried out. Printing is effected on the face of the sheet opposite to that which has been partially impregnated and coated. Said untreated face forms an excellent printing surface since it retains its fibrous nature. Additional improvement stems from the fact that, since one face is coated and the other fibrous, the development of static electricity is retarded; and stacking and feeding operations are carried out without difficulty. In contrast to a thoroughly impregnated sheet, one partially impregnated and coated on one side only has such toughness and flexibility properties as to enable the grippers on the printing presses to handle the material satisfactorily without fracture. The thoroughly impregnated sheet cannot be readily handled since it is stiff and brittle and behaves very badly in stacking and feeding operation; development of excessive static makes it almost impossible to handle on a press.

After the printing step, the decorated surface may be treated with a thermosetting resin solution of the same type as that used for said partial impregnation and coating (preferably a melamine formaldehyde resin solution) to cover the printed surface. This step is desirable in some cases. The printed sheet, (whether or not further treated on the printed surface) is placed in the mold where a preform has been produced, printed side away from the preform and a blank impregnated cover sheet is placed over it. Impregnation of the cover sheet is effected using the same type of resin as that used for partially impregnating and coating the sheet on which the decoration is printed. The mold is then closed and the molding cycle is completed. The blank impregnated cover sheet is preferably a paper material and may have a thickness up to about 0.01 inch. Using the procedure outlined above, the coated printed sheet, as well as the blank impregnated sheet become an inherent part of the final molded product. The printed colors are retained beneath the transparent film of impregnated paper and are extremely fast to the operations to which it may be subjected.

Formation of articles in accordance with the invention is illustrated by the accompanying drawings in which paper thicknesses in cross-section are shown in greatly exaggerated dimensions.

Figure 1:
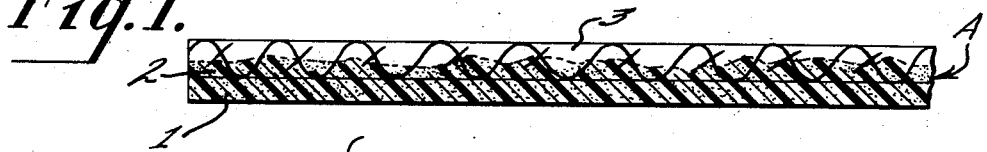
Fig. 1 is a cross-sectional view showing the various surfaces of the impregnated and coated paper.
Figure 2:
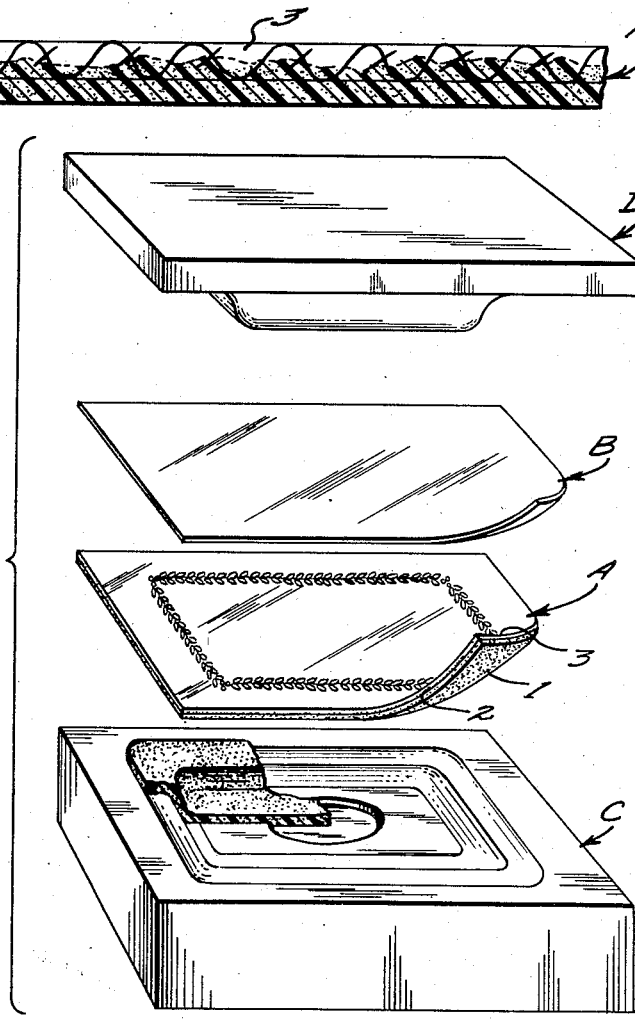
Fig. 2 is an exploded view showing the manner in which the paper sheets are placed in the mold.
Figure 3:
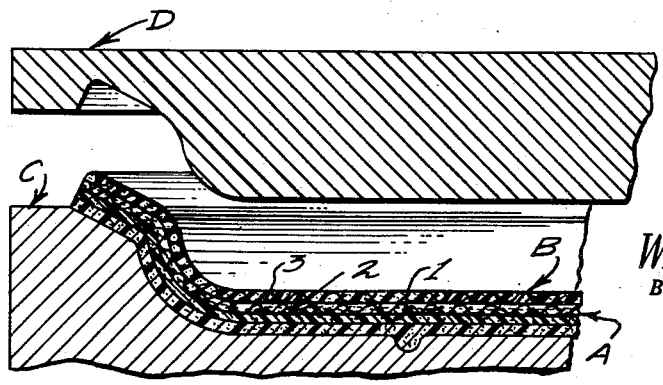
Fig. 3 is a fragmentary diagrammatic sectional elevation of the partially cured article in the mold.

Referring to Fig. 1 of the drawing, 1 represents the melamine formaldehyde coating on the under surface of the paper sheet; 2 represents the portion of the under surface of the paper sheet impregnated with the same melamine formaldehyde resin as that used for coating; and 3 represents the upper unimpregnated, uncoated surface of the sheet on which printing is effected. In Figs. 2 and 3, B is a totally impregnated cover sheet, impregnation having been carried out with the same melamine formaldehyde resin as that used for coating and impregnating sheet A, described in Fig. 1. Referring again to Fig. 2, C represents the base portion of a mold containing molding powder of the desired type (e. g. melamine formaldehyde); and D represents the cooperating cover portion of the mold. After closing the mold, pressure (preferably about 75–124 tons) is applied and the temperature is raised to about 125–150° C. The mold is opened prior to completion of the curing process and sheet A is placed in the desired position in the mold with the decorated surface away from the partially cured article. Sheet B is then placed over sheet A in the indicated manner and curing is completed.

The coated and printed sheets used in the present invention have several outstanding advantages. Compared to a fully impregnated sheet, they are far more flexible and less friable. Thus, the sheets of the invention, when used for the decoration of dishes of substantial depth will more easily conform to the shape of the mold. Substantially no folding results to mar the printed matter and no significant cracking is evident in contrast to that which might be expected because of the friability of a fully impregnated sheet. As has been indicated above, the paper coated on one side only resists the development of static charge and thus may be satisfactorily fed through the grippers of the printing machine and readily stacked. By using a blank impregnated sheet over the printed surface, the inks do not come in contact with the mold and staining by off-set is avoided.

In order to more fully illustrate the invention, the following specific example is set forth. It being understood, however, that the example is merely illustrative and that the invention is by no means limited thereto.

*Example*

In the example, the sheets carrying the printing are partially impregnated and/or coated with a melamine-formaldehyde resin and are then used to decorate a plastic material made of the same resin. As has been indicated above, it is preferable to operate in this manner for maximum effectiveness. Thus, if a material were being molded of a melamine (or phenol) formaldehyde resin, the paper containing the decoration would be impregnated and/or coated with a melamine (or phenol) formaldehyde resin.

For coating and partial impregnation, a solution of the following composition (parts are by weight) may be used:

60 pts. melamine-formaldehyde resin (Melmac 405)[1]
25 pts. water
10 pts. ethyl alcohol
(2 pts. accelerator [ammonium chloride, etc.] is added before use)

This composition is made up by the usual procedure of stirring the resin into the water at 160° F. containing a portion of the alcohol. After solution, the accelerator is added just before use. The degree of penetration of the resin into the paper can be controlled by varying the viscosity through the addition of more or less water and may thus be carefully controlled to adjust the penetration as desired.

Preferably, a rayon paper about .005 inch thick is used. However, there is considerate latitude in this respect since the coating produces the product that is heavy enough and suitable for printing.

In applying the coating to the paper, I find an increase in weight of about 25 to 50% is very satisfactory since some of this penetrates further into the paper under heat and pressure in the molding operation and any excess is squeezed out in the flash.

The melamine-formaldehyde used in the invention may be the Melmac 405 mentioned above in the specific working example. One may also use in its place, Melmac 1077 or 1079, each of which melamine-formaldehyde resin contains alpha cellulose as the filler, has a specific gravity of 1.5 and a tensile strength of 7,000–8,000 lb./sq. in. Also useful in the invention is the alpha cellulose-filled melamine-formaldehyde resin sold by Libbey-Owens-Ford Glass Company under the trademark "Plaskon." This material also has a specific gravity about 1.5 and a tensile strength of about 10,000 lb./sq. in. As has been indicated above, the accelerator is added to the resin composition just before use. This accelerator is preferably ammonium chloride, however, any of the other accelerators known in the art may be substituted. For example, other ammonium salts which liberate acid may be used; and organic halogen derivatives which liberate hydrogen halide on heating, such as bromohydrosuccinic acid, beta chloro (or beta bromo) ethyl urea may be used as so-called "latent accelerators." Other accelerators such as phosphoric acid esters, organic amides and imides (e. g. benzoic acid amide, N-benzoyl succinamide, N-propionyl-phthalamide, alpha dichlorhydrin, etc. The inks used for printing the decoration on the coated, partially impregnated paper are those known to be useful in lithography and fast to heat and formalin vapors. They are usually linseed oil varnish suspensions of pigments, such as Pigment Scarlet, Phthalocyamine Blue, Phthalocyamine Green, Carbon Black, Hansa Yellow, Victoria Blue, Rhoduline Blue, et. Melamine formaldehyde (or equivalent) resins may be added, if desired, for improving the adhesive characteristics of the ink.

To effect coating and partial impregnation of the sheet which is to be decorated, the paper is removed from the roll and permitted to pass through a series of two or three guide rolls, then over two bars between which is a tank with an adjustable feed mechanism for feeding the resin solution (Melmac 405; 60 percent resin solids in aqueous ethanol) onto the paper. A doctor blade is positioned immediately beyond the point at which the resin is fed onto the sheet and the blade wipes off whatever excess resin solution may be present on the paper. The resin treated paper then passes over rollers through an oven, maintained at about 165° to 175° F., for drying and is then rolled up, cut into sheets and trimmed for the subsequent printing operation.

Impregnation of the paper sheet used to cover the printed sheet in the mold is effected in accordance with the standard procedure. Thus, the paper is allowed to pass through a bath containing a resin solution (one containing 50 percent melamine-formaldehyde resin solids [e. g. Melmac 405] in aqueous ethanol is satisfactory). After impregnation the paper is passed through squeezed rollers to remove the excess resin and then dried by air-drying or heating at 150–175° F.

After the coated and partially impregnated paper has been dried, and cut into trimmed sheets, the design is printed on the uncoated surface in the standard lithographic manner and, after the printed surface is dried, it may be used for attachment to the molded preform material.

For applying the decoration to the preform, the printed sheet is applied to the mold containing the preform with the printed surface away from the preform. A sheet thoroughly saturated and impregnated with melamine resins is then placed over the printed surface, the mold is closed and the molding operation is completed.

This invention may be variously otherwise embodied within the scope of the appended claims.

I claim:

1. The process of applying a decorative surface to an article made by compression molding of a thermosetting resin molding powder which comprises impregnating and coating only one surface of an absorbent paper with a thermosetting resin of the same group as said thermosetting resin molding powder, printing a decorative design on the uncoated surface of said absorbent paper to form a decorated sheet, impregnating a second absorbent paper, placing said impregnated absorbent paper over the decorative design on said decorated sheet to form a two-sheet assembly, positioning said assembly on the article in the opened mold prior to completion of the curing step with the decorative design away from said article in said mold, completing the curing step and removing the molding.

2. The process of claim 1 wherein the thermosetting resin molding powder is a melamine-formaldehyde molding powder and the thermosetting resin used for impregnation and coating is a melamine-formaldehyde resin.

3. The process of claim 1 wherein a thermosetting molding powder is added to the surface of the paper having the decorative design.

(References on following page)

---

[1] Urea-formaldehyde resin containing alpha cellulose as filler.

References Cited in the file of this patent

UNITED STATES PATENTS

| | | |
|---|---|---|
| 1,454,845 | Clay | May 15, 1923 |
| 1,634,830 | Hargrave | July 5, 1927 |
| 1,880,930 | Elbel et al. | Oct. 4, 1932 |
| 2,040,564 | Rapley | May 12, 1936 |
| 2,084,081 | Faber | June 15, 1937 |
| 2,410,361 | Prance | Oct. 29, 1946 |
| 2,646,380 | Barlow et al. | July 21, 1953 |

FOREIGN PATENTS

| | | |
|---|---|---|
| 605,643 | Great Britain | July 28, 1948 |

OTHER REFERENCES

"Laminating With Melamine Resins," Plastics; December 1946; pages 46, 48, 49, 94 and 95.